Figure 1:
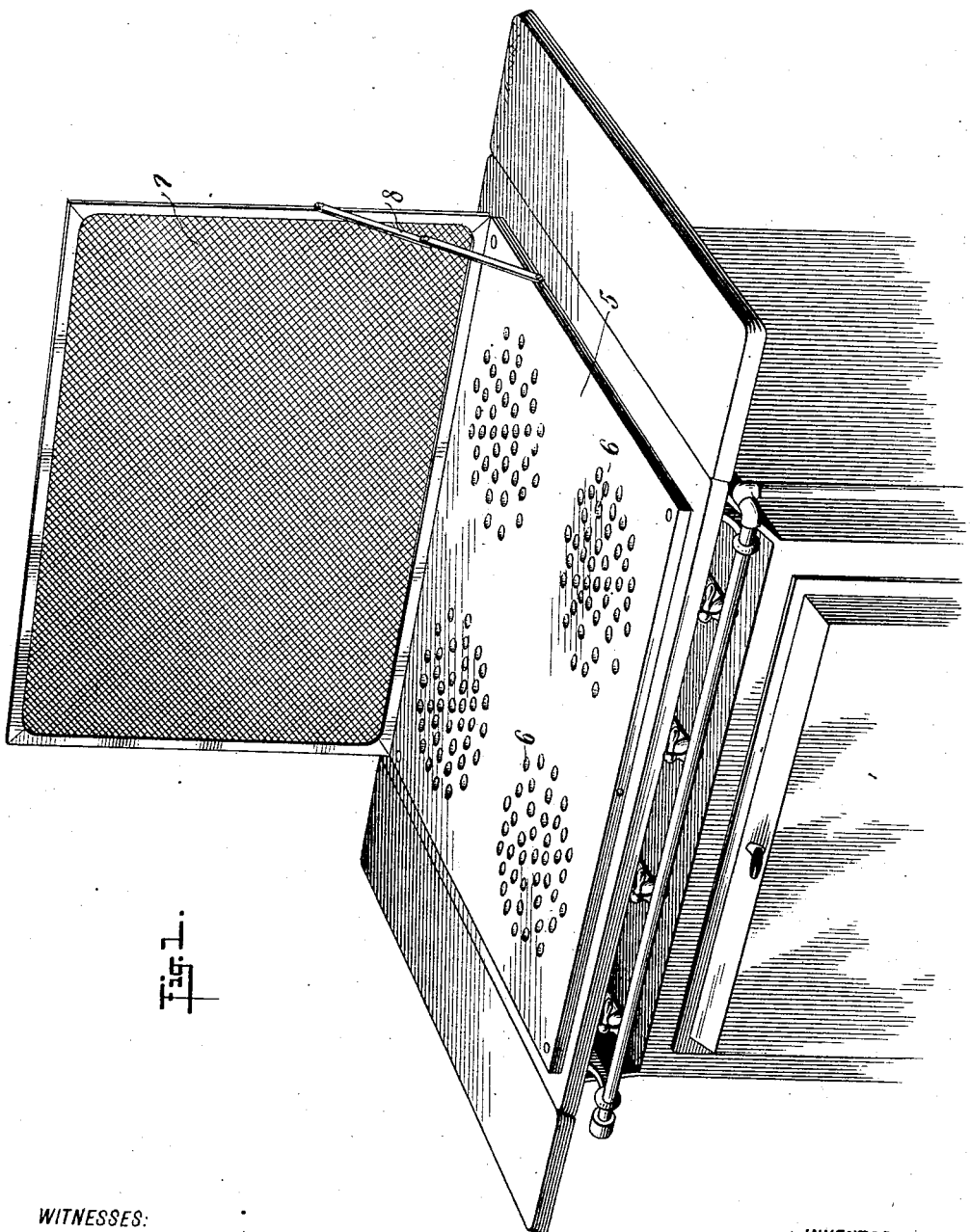

F. G. DUPELL.
TOASTER, HEATER, AND WARMER.
APPLICATION FILED JUNE 10, 1910.

969,093.

Patented Aug. 30, 1910.
2 SHEETS—SHEET 1.

WITNESSES:

INVENTOR
Frank G. Dupell
BY
ATTORNEYS

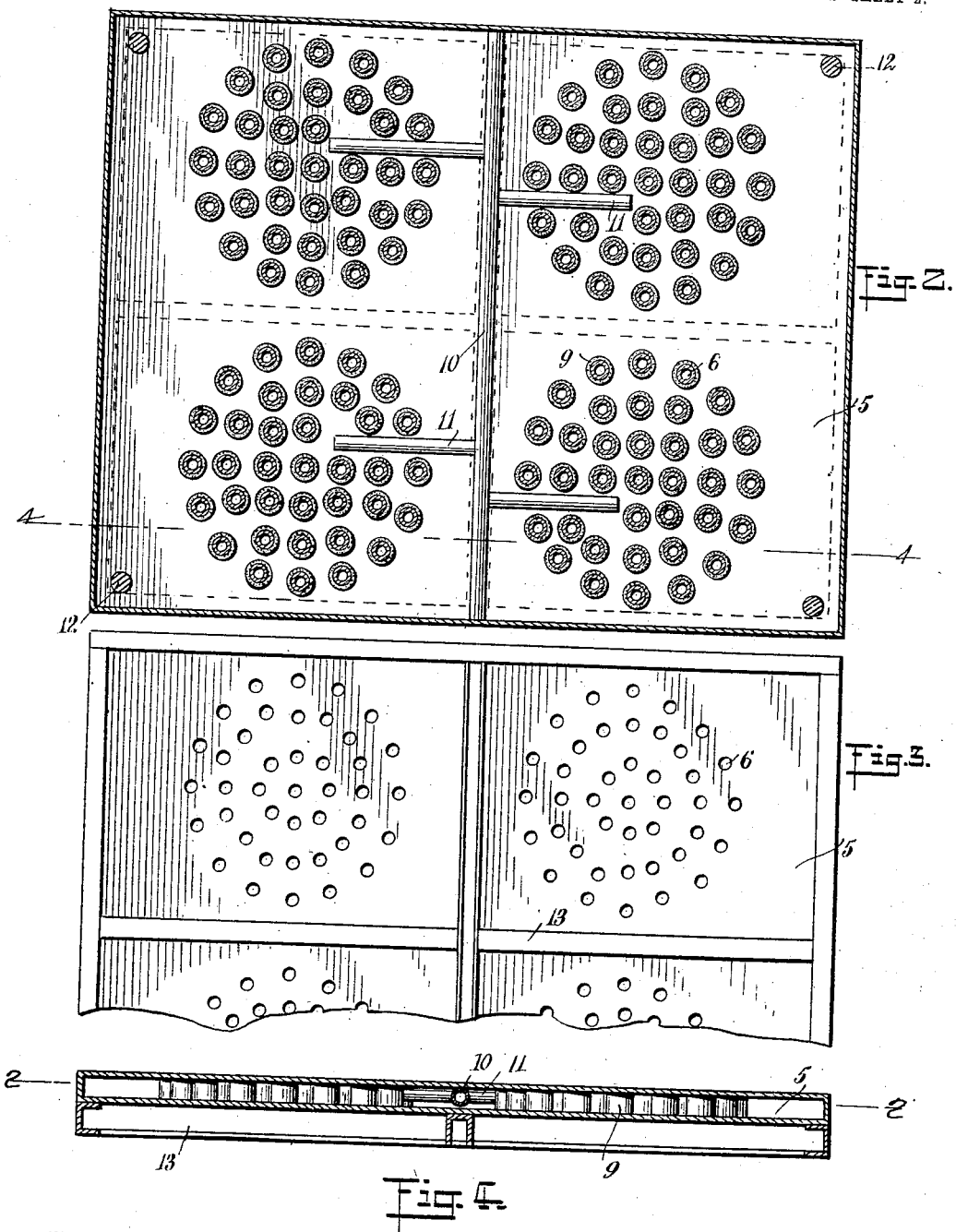

UNITED STATES PATENT OFFICE.

FRANK GERARD DUPELL, OF NEW YORK, N. Y.

TOASTER, HEATER, AND WARMER.

969,093.  Specification of Letters Patent. Patented Aug. 30, 1910.

Application filed June 10, 1910. Serial No. 566,167.

*To all whom it may concern:*

Be it known that I, FRANK GERARD DUPELL, a citizen of the United States, and a resident of the city of New York, borough of Brooklyn, in the county of Kings and State of New York, have invented a new and Improved Toaster, Heater, and Warmer, of which the following is a full, clear, and exact description.

The invention is an improved toaster, heater and warmer for gas or vapor stoves, and has in view such a device embodying a heating chamber and a reticulated or perforated cover foldable or otherwise movable over the top wall of the chamber to provide a toaster, the heating chamber being constructed to seat on the top of the stove, and having a series of flues passing therethrough over each burner, the vessels to be heated being ordinarily seated over the flues under which a burner is lighted, and a vessel or article to be warmed being likewise supported on the heating chamber at a point removed from the lighted burner. The heating chamber is preferably provided with piping for distributing the heated air from around one set of flues to another, and for conducting the heated air from these points to the joint at the edges of the chamber to prevent the walls of the latter from warping or breaking loose.

Reference is to be had to the accompanying drawings forming a part of this specification, in which similar characters of reference indicate corresponding parts in all the views.

Figure 1 is a perspective view of a combined toaster, heater and warmer constructed in accordance with my invention, the same being shown in position on a gas range, with the toaster swung upwardly from the heater and warmer, as is the case when the latter is in use; Fig. 2 is a horizontal section through the heating chamber constituting the heater and warmer, the section being taken substantially on the line 2—2 of Fig. 4; Fig. 3 is an inverted plan of the heater and warmer; and Fig. 4 is a longitudinal section of the same substantially on the line 4—4 of Fig. 2.

In the construction of my improved toaster, heater and warmer, I provide a relatively thin heating chamber 5, through which extends a series of flues 6 for each burner of the stove the device is designed to cover, the form of the invention illustrated being designed for a gas or vapor stove having four burners at the top.

A reticulated or perforated cover 7 for the heating chamber constitutes a toaster, and, as shown, is assembled with the heater and warmer, which is afforded by the heating chamber, by hinging the heater and toaster together at their rear edges so that the cover can fold upon the top wall of the chamber, in which position it is serviceable as a toaster; or swung upright, as shown in Fig. 1, in which position the device is used for heating and warming purposes, the cover being held in this upper position by suitable means, such as the folding links 8.

The heating flues 6 as shown in Fig. 2, are each covered with an insulation 9, to insure the concentration of the heat on the vessel or other article seated over the flues, and prevent the heating chamber from becoming excessively hot. A pipe 10 extends across the chamber at or near the center and connects at the walls of the latter at the edges, the pipe having a number of air pipes 11 leading from points between the flues, the pipes 10 and 11 serving to distribute the heat from around one set of flues to the others, and the pipe 10 acting as a brace and distributing the heat to the edges of the chamber, and in this manner preventing the warping of the walls of the latter or the breaking apart of the same at the joint formed at the edges. The top and bottom plates of the heater and warmer, constituting the upper and lower walls of the heating chamber, are secured together at the corner by rivets or other equivalent devices 12.

As shown in Figs. 3 and 4, guard flanges 13 are attached to the under side of the heater and warmer and extend about each set of flue openings, the flanges preventing a burner of the stove being lighted from an adjacent burner, as when the gas is turned on to another burner after one or more burners are lighted, and in this manner causing an explosion. The flanges also serve to concentrate the flame and heat under the particular set of flues under which the burner of the stove is lighted.

Having thus described my invention, I claim as new and desire to secure by Letters Patent:

1. The combination of a heating chamber adapted to seat on the top of a gas or vapor stove and provide a heater and warmer, the chamber having a series of flues extending therethrough for each burner of the stove, and a reticulated cover adapted to seat on the top of the chamber and provide a toaster.

2. A heater and warmer comprising a heating chamber adapted to seat on the top of a gas or vapor stove, the chamber having a series of flues passing therethrough for each of the burners of the stove.

3. A heater and warmer comprising a heating chamber adapted to seat on the top of a gas or vapor stove, and having a series of flues extending therethrough for each of the stove burners, and a guard flange arranged on the under side of the chamber around each set of flues.

4. A heater and warmer comprising a heating chamber adapted to seat on the top of a gas or vapor stove, and having a series of flues extending therethrough, each set of flues arranged to overlie one of the gas burners of the stove, and pipes arranged within the chamber for distributing the heat around one set of flues to points about the other sets of flues.

5. A heater and warmer comprising a heating chamber adapted to seat on the top of a gas or vapor stove, and having a series of flues extending therethrough, each set of flues ararnged to overlie one of the gas burners of the stove, and a heat-distributing pipe extending across the heater and the warmer within the heating chamber and reinforcing the heater and warmer at intermediate points.

In testimony whereof I have signed my name to this specification in the presence of two subscribing witnesses.

FRANK GERARD DUPELL.

Witnesses:
   JULIUS ROTHMAN,
   GEORGE BUSS.